United States Patent
Shibata et al.

(10) Patent No.: US 9,935,487 B2
(45) Date of Patent: Apr. 3, 2018

(54) POWER RECEIVING APPARATUS AND POWER TRANSMISSION SYSTEM

(71) Applicant: Murata Manufacturing Co., Ltd., Nagaokakyo-shi, Kyoto-fu (JP)

(72) Inventors: Akihiko Shibata, Nagaokakyo (JP); Satoshi Shinoda, Nagaokakyo (JP); Hironori Sakai, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 277 days.

(21) Appl. No.: 15/040,266

(22) Filed: Feb. 10, 2016

(65) Prior Publication Data

US 2016/0164307 A1    Jun. 9, 2016

Related U.S. Application Data

(63) Continuation of application No. PCT/JP2014/080718, filed on Nov. 20, 2014.

(30) Foreign Application Priority Data

Dec. 5, 2013 (JP) .................................. 2013-251670

(51) Int. Cl.
*H02J 7/02* (2016.01)
*H02J 50/05* (2016.01)
(Continued)

(52) U.S. Cl.
CPC .............. *H02J 7/025* (2013.01); *H02J 5/005* (2013.01); *H02J 50/05* (2016.02); *H02J 50/12* (2016.02)

(58) Field of Classification Search
CPC ............. H02J 5/005; H02J 50/12; H02J 7/025
See application file for complete search history.

(56) References Cited

U.S. PATENT DOCUMENTS

| 4,835,373 A | 5/1989 | Adams et al. |
| 8,452,235 B2 | 5/2013 | Kirby et al. |

(Continued)

FOREIGN PATENT DOCUMENTS

| CN | 103187755 A | 7/2013 |
| JP | S63280393 A | 11/1988 |

(Continued)

OTHER PUBLICATIONS

International Search Report issued for PCT/JP2014/080718, dated Dec. 16, 2014.

(Continued)

*Primary Examiner* — Jeffrey Shin
(74) *Attorney, Agent, or Firm* — Arent Fox LLP (57) ABSTRACT

A power receiving apparatus to which power is transmitted from a power transmission apparatus through electric field coupling includes a parallel resonance circuit in which an active electrode and a passive electrode are connected, a capacitor and a first switch that change a resonance condition of the parallel resonance circuit, and a second switch that supplies or cuts off an AC voltage, outputted from the parallel resonance circuit, to or from a load. The power receiving apparatus also includes a communication unit that notifies of the start of communication with the power transmission apparatus and receives a response to the notification, a first switching unit that generates a signal to be sent to the power transmission apparatus, and a second switching unit that connects or disconnects the second switch based on the response received by the communication unit.

20 Claims, 8 Drawing Sheets (51) Int. Cl.
*H02J 50/12* (2016.01)
*H02J 5/00* (2016.01)

(56) References Cited

U.S. PATENT DOCUMENTS

| | | | |
|---|---|---|---|
| 9,007,019 B2 | 4/2015 | Iijima et al. | |
| 9,246,357 B2 | 1/2016 | Kamata | |
| 2010/0246622 A1 | 9/2010 | Watanabe et al. | |
| 2011/0018358 A1 | 1/2011 | Kozakai | |
| 2011/0217927 A1 | 9/2011 | Ben-Shalom et al. | |
| 2012/0038317 A1* | 2/2012 | Miyamoto | H02J 7/025 320/108 |
| 2013/0027078 A1* | 1/2013 | Nakano | H04B 5/0037 324/764.01 |
| 2013/0134927 A1* | 5/2013 | Park | H04B 5/0037 320/107 |
| 2013/0147281 A1 | 6/2013 | Kamata | |
| 2013/0162220 A1 | 6/2013 | Iijima et al. | |
| 2015/0295450 A1* | 10/2015 | Bae | H02J 5/005 320/108 |
| 2016/0141882 A1* | 5/2016 | Ichikawa | H02J 17/00 307/104 |

FOREIGN PATENT DOCUMENTS

| | | |
|---|---|---|
| JP | 2011029799 A | 2/2011 |
| JP | 2012503466 A | 2/2012 |
| JP | 2012065476 A | 3/2012 |
| JP | 2012522483 A | 9/2012 |
| JP | 2013141387 A | 7/2013 |

OTHER PUBLICATIONS

Written Opinion of the International Searching Authority issued for PCT/JP2014/080718, dated Dec. 16, 2014.

* cited by examiner

POWER RECEIVING APPARATUS AND POWER TRANSMISSION SYSTEM

CROSS REFERENCE TO RELATED APPLICATIONS

The present application is a continuation of PCT/JP2014/080718 filed Nov. 20, 2014, which claims priority to Japanese Patent Application No. 2013-251670, filed Dec. 5, 2013, the entire contents of each of which are incorporated herein by reference.

FIELD OF THE INVENTION

The present invention relates to a power receiving apparatus to which power is transmitted wirelessly from a power transmission apparatus, and to a power transmission system that includes the stated apparatuses.

BACKGROUND OF THE INVENTION

A power transmission system includes a power transmission apparatus and a power receiving apparatus. The power transmission apparatus uses magnetic field coupling or electric field coupling to transmit power to the power receiving apparatus wirelessly. The power receiving apparatus supplies the transmitted power to a load such as a secondary battery of a cellular phone or a laptop computer, for example, and charges the secondary battery. In such a power transmission system, it is necessary for the power transmission apparatus to monitor the type, status, and so on of the power receiving apparatus. Accordingly, the power transmission apparatus and the power receiving apparatus are provided with communication functions that enable the power transmission apparatus and the power receiving apparatus to communicate with each other.

A system using load modulation, for example, is used as a system of communication between the power transmission apparatus and the power receiving apparatus. In this system, signals of "0" and "1" are sent from the power receiving apparatus to the power transmission apparatus by varying a load impedance on the power receiving apparatus side as viewed from the power transmission apparatus side. However, in the case where there is a load variation, there are cases where the power transmission apparatus cannot determine whether the load variation is due to communication or whether the load variation is due to the status of the load of the power receiving apparatus. For example, in the case where the load of the power receiving apparatus is a laptop computer being used by a user, if the CPU load in the laptop computer increases suddenly and the consumed power rises momentarily while power is being transmitted, the load impedance will momentarily decrease as seen from the power transmission apparatus side. In this case, the load variation is not a load variation caused by communication, and thus there is a risk of erroneous information being obtained on the power transmission apparatus side.

Patent Document 1 discloses a system, in which power transmission and communication can be carried out between a power transmission apparatus and a power receiving apparatus, where power supply and communication are not carried out simultaneously. In this system, each apparatus uses a resonating element (a coil) for power transmission as a communication antenna. A switching circuit is provided between the communication unit and the resonating element, and the switch is switched off during the supply of power and on during communication. This ensures that power supply and communication are not carried out simultaneously.

Patent Document 1: Japanese Unexamined Patent Application Publication No. 2011-29799.

However, the system disclosed in Patent Document 1 has the following problem. For example, in the case where the load of the power receiving apparatus is a laptop computer battery and the remaining charge in the battery is approximately 0, if, as in Patent Document 1, the switch is turned off for communication and the supply of power to the battery is turned off while the computer is running and power is being supplied to the battery, problems such as the computer having insufficient power and not operating correctly, the computer forcefully being shut down during processing, or the like may arise. In this manner, there is a risk that unanticipated problems will arise in the load of the power receiving apparatus if the load is cut off during communication and the supply of power to the load is turned off without consideration for the status of the load.

SUMMARY OF THE INVENTION

Accordingly, it is an object of the system disclosed herein to provide a power receiving apparatus and a power transmission system that communicate with a power transmission apparatus and supply power to a load while suppressing problems arising in the load.

According to the present disclosure, a power receiving apparatus to which power is transmitted from a power transmission apparatus by a power receiving-side coupling unit coupling with a power transmission-side coupling unit of the power transmission apparatus through an electric field or a magnetic field includes a resonance circuit connected to the power receiving-side coupling unit, a resonance condition changing circuit that has a first switch and that changes a resonance condition of the resonance circuit on the basis of a state of the first switch, a rectifying and smoothing circuit that rectifies and smoothes an AC voltage outputted from the resonance circuit and supplies the voltage to a load, a second switch that connects or disconnects the rectifying and smoothing circuit and the load, a communication unit that notifies of the start of communication with the power transmission apparatus and receives a response to the notification, a first switching unit that turns the first switch on and off to generate a signal to be sent to the power transmission apparatus, and a second switching unit that connects or disconnects the second switch on the basis of the response received by the communication unit.

According to this configuration, the resonance point of the resonance circuit is shifted by turning the first switch on and off, and thus a load variation arises. A signal can be sent to the power transmission apparatus using this load variation. Meanwhile, in the case where a response has been received from the load side and it has been determined that the supply of power to the load can be stopped, the supply of power to the load is cut off by turning the second switch off (or momentarily turning the switch off). Accordingly, it is possible to suppress load variation caused by the supply of power to the load from affecting load variation for sending a signal to the power transmission apparatus, and thus the power receiving apparatus and power transmission apparatus can communicate accurately. Furthermore, in the case where a response is received from the load side and it has been determined that the supply of power to the load cannot be stopped, power is supplied to the load by turning the second switch on (or momentarily turning the switch on), which makes it possible to suppress the risk of a problem caused by insufficient power in the load from arising.

In the power receiving apparatus according to the present disclosure, it is preferable that the second switching unit turn the second switch off in the case where the supply of power to the load is to be stopped and turn the second switch on in the case where the supply of power to the load is not to be stopped.

According to this configuration, power can be supplied to the load, or the supply of power can be cut off.

In the power receiving apparatus according to the present disclosure, it is preferable that the first switching unit turn the first switch off in the case where the supply of power to the load is not to be stopped.

According to this configuration, in the case where the second switch is on, the first switch is turned off and communication is not carried out with the power transmission apparatus. Accordingly, it is possible to suppress load variation caused by the supply of power to the load from affecting load variation for sending a signal to the power transmission apparatus, and thus suppress the risk of an erroneous signal being sent to the power transmission apparatus.

In the power receiving apparatus according to the present disclosure, it is preferable that the resonance condition changing circuit be a serial circuit, constituted by the first switch and an inductor or a capacitor, connected in parallel to the resonance circuit.

According to this configuration, the resonance condition of the resonance circuit can be changed using a simple configuration.

It is preferable that the power receiving-side coupling unit have a power receiving-side first electrode and a power receiving-side second electrode; the power receiving-side first electrode oppose a power transmission-side first electrode provided in the power transmission-side coupling unit, with a gap between the power receiving-side first electrode and the power transmission-side first electrode; the power receiving-side second electrode oppose a power transmission-side second electrode provided in the power transmission-side coupling unit, with a gap between the power receiving-side second electrode and the power transmission-side second electrode, or make contact with the power transmission-side second electrode; and the resonance circuit be connected to the power receiving-side first electrode and the power receiving-side second electrode.

According to this configuration, in the case where power is supplied from the power transmission apparatus to the power receiving apparatus through electric field coupling, it is possible to suppress load variation caused by the supply of power to the load from affecting load variation for sending a signal to the power transmission apparatus, and thus the power receiving apparatus and power transmission apparatus can communicate accurately.

It is preferable that the power receiving-side coupling unit have a power receiving-side coil that couples with a power transmission-side coil provided in the power transmission-side coupling unit through a magnetic field, and the resonance circuit be connected to the power receiving-side coil.

According to this configuration, in the case where power is supplied from the power transmission apparatus to the power receiving apparatus through magnetic field coupling, it is possible to suppress load variation caused by the supply of power to the load from affecting load variation for sending a signal to the power transmission apparatus, and thus the power receiving apparatus and power transmission apparatus can communicate accurately.

Advantageous Effects of Invention

According to the present disclosure, it is possible to suppress load variation caused by the supply of power to the load from affecting load variation for sending a signal to the power transmission apparatus, and thus the power receiving apparatus and power transmission apparatus can communicate accurately. In addition, in the case where the supply of power to the load is not to be stopped, the risk of a problem arising due to insufficient power in the load, resulting from the supply of power to the load being cut off, can be suppressed.

DETAILED DESCRIPTION

First Embodiment

Figure 1:
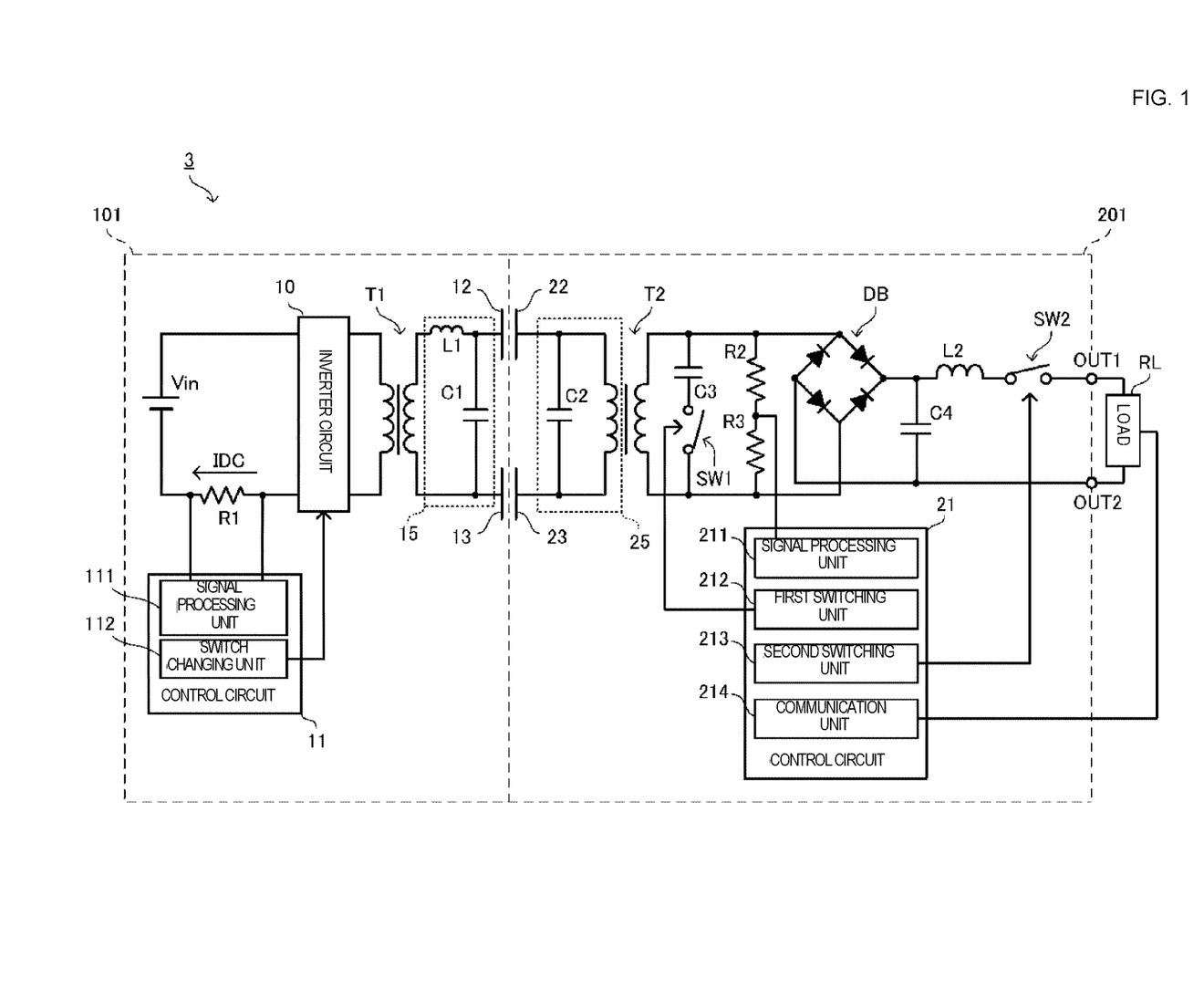
FIG. 1 is a circuit diagram of a power transmission system according to a first embodiment.

FIG. 1 is a circuit diagram of a power transmission system according to the present embodiment.

A power transmission system 1 includes a power transmission apparatus 101 and a power receiving apparatus 201. The power transmission apparatus 101 transmits power to the power receiving apparatus 201 through electric field coupling. The power receiving apparatus 201 supplies the power from the power transmission apparatus 101 to a load RL.

A cellular phone, a laptop computer, or the like can be given as an example of the load RL. The load RL includes a secondary battery, and the secondary battery is charged with the power supplied from the power receiving apparatus 201. The load RL operates using the secondary battery as a power source. The load RL also has a communication (serial communication, for example) function, and communicates bidirectionally with the power receiving apparatus 201. Upon receiving a signal from the power receiving apparatus 201, the load RL sends information in response thereto.

The power transmission apparatus 101 includes a power source Vin. The power source Vin is an AC adapter connected to a commercial power supply. The AC adapter converts AC 100 V-230 V into a predetermined DC voltage.

An inverter circuit 10 is connected to the power source Vin of the power transmission apparatus 101. The inverter circuit 10 is a DC-AC inverter circuit constituted by four switching elements (MOS-FETs). Each switch in the inverter circuit 10 is PWM-controlled, and the DC voltage from the power source Vin is converted into an AC voltage.

A primary coil of a step-up transformer T1 is connected to an output side of the inverter circuit 10. An active electrode 12 and a passive electrode 13 are connected to a secondary coil of the step-up transformer T1. The step-up transformer T1 steps up the AC voltage converted from the DC voltage by the inverter circuit 10.

A capacitor C1 is connected in parallel to the secondary coil of the step-up transformer T1, and the capacitor C1 forms a serial resonance circuit 15 along with a leakage inductance L1 of the secondary coil of the step-up transformer T1. According to one exemplary embodiment, the leakage inductance L1 that is included in the serial resonance circuit 15 can be an actual inductor.

According to an exemplary aspect, the active electrode 12 and passive electrode 13 can be considered "power transmission-side coupling unit". Furthermore, the active electrode 12 can be considered a "power transmission-side first electrode" and the passive electrode 13 can be considered a "power transmission-side second electrode". The AC voltage stepped up by the step-up transformer T1 is applied to the active electrode 12 and the passive electrode 13. An active electrode 22 of the power receiving apparatus 201 opposes the active electrode 12, and a passive electrode 23 of the power receiving apparatus 201 opposes (or makes contact with) the passive electrode 13. The opposing active electrodes 12 and 22 and passive electrodes 13 and 23 respectively undergo electric field coupling, and power is transmitted from the power transmission apparatus 101 to the power receiving apparatus 201.

The power transmission apparatus 101 includes a control circuit 11. The control circuit 11 includes a microcomputer, and has function units of a signal processing unit 111 and a switch changing unit 112.

The signal processing unit 111 reads changes in a power transmission current IDC of the power transmission apparatus 101 and determines between data of a "1" or a "0". The power transmission current IDC is a DC current flowing in a current detection resistance R1 connected between the power source Vin and the inverter circuit 10. Although details will be given later, on the power receiving apparatus 201 side, a load impedance on the power receiving apparatus 201 side as seen from the power transmission apparatus 101 is varied by shifting a resonance point of a resonance circuit (by changing a resonance condition) in order to generate a signal to be transmitted to the power transmission apparatus 101. The power transmission current IDC changes due to the variation in the load impedance. When the load on the power receiving apparatus 201 side becomes heavier (when the impedance drops), the power transmission current IDC increases, and when the load on the power receiving apparatus 201 side becomes lighter (when the impedance rises), the power transmission current IDC decreases. The signal processing unit 111 finds the amount of change in the power transmission current IDC and obtains binary data for the current, namely high (H) or low (L), from the amount of change found. The signal processing unit 111 then reads a modulated signal sent from the power receiving apparatus 201 using that binary data.

The switch changing unit 112 changes the on duty of each switch element of the inverter circuit 10 and carries out PWM control of the switch elements. By the switch changing unit 112 carrying out PWM control of the switch elements, the power transmitted to the power receiving apparatus 201 can be adjusted and the binary data modulated signal can be sent to the power receiving apparatus 201.

A primary coil of a step-down transformer T2 is connected to the active electrode 22 and the passive electrode 23 of the power receiving apparatus 201. The active electrode 22 and the passive electrode 23 can be considered an example of a "power receiving-side coupling unit". Moreover, the active electrode 22 can be considered a "power receiving-side first electrode" and the passive electrode 23 can be considered a "power receiving-side second electrode" according to the exemplary embodiment. A capacitor C2 is connected in parallel to the primary coil of the step-down transformer T2, and the primary coil and the capacitor C2 form a parallel resonance circuit 25.

The parallel resonance circuit 25 is an example of a "resonance circuit" according to the present disclosure. The parallel resonance circuit 25 is designed so that a resonant frequency matches with the serial resonance circuit 15 formed on the power transmission apparatus 101 side. Power can be transmitted from the power transmission apparatus 101 to the power receiving apparatus 201 efficiently by ensuring that the resonant frequency matches between the serial resonance circuit 15 and the parallel resonance circuit 25.

A serial circuit formed by a capacitor C3 and a first switch SW1 is connected in parallel to the secondary coil of the step-down transformer T2. The serial circuit is an example of a "resonance condition changing circuit" according to the present disclosure. The first switch SW1 of the serial circuit is PWM-controlled by a control circuit 21, which will be described later. According to the exemplary embodiment, when the first switch SW1 has been turned on, a circuit configuration is formed where the capacitor C3 is connected to the parallel resonance circuit 25 in parallel. In other words, the resonance point of the parallel resonance circuit 25 shifts due to the first switch SW1 being turned on, and thus when the first switch SW1 is turned on and off, the load impedance changes on the power receiving apparatus 201 side as seen from the power transmission apparatus 101. Changing the load impedance also changes the power transmission current IDC, and thus as described earlier, the signal sent from the power receiving apparatus 201 to the power transmission apparatus 101 is read by the control circuit 11 reading the power transmission current IDC.

A diode bridge DB formed from four diodes is connected to the secondary coil of the step-down transformer T2. A smoothing circuit that includes a capacitor C4 and an inductor L2 is connected to the diode bridge DB. The diode bridge DB and the capacitor C4 are an example of a rectifying and smoothing circuit according to the present disclosure, and rectify and smooth the AC voltage stepped-down by the step-down transformer T2. The smoothing circuit is connected to output terminals OUT1 and OUT2 with a second switch SW2 interposed therebetween. The load RL is connected to the output terminals OUT1 and OUT2.

The second switch SW2 undergoes switching control by the control circuit 21. Power is supplied to the load RL when the second switch SW2 is on, and the supply of power to the load RL is cut off in the case where the second switch SW2 is off.

The power receiving apparatus 201 includes the control circuit 21. The control circuit 21 is a microcomputer, for example, and has function units of a signal processing unit 211, a first switching unit 212, a second switching unit 213, and a communication unit 214.

The signal processing unit 211 detects the voltage transmitted from the power transmission apparatus 101 to the power receiving apparatus 201 and stepped down by the step-down transformer T2. More specifically, voltage dividing resistances R2 and R3, serving as a detection circuit, are connected in parallel to the secondary coil of the step-down transformer T2. The signal processing unit 211 detects the voltage using the voltage dividing resistances R2 and R3.

On the power transmission apparatus 101 side, the switch elements of the inverter circuit 10 are PWM-controlled by the control circuit 11. Accordingly, the divided voltage detected by the signal processing unit 211 varies. The signal processing unit 211 finds the amount of change in this varying voltage and obtains binary data for the current, namely high (H) or low (L), from the amount of change found. The signal processing unit 211 then reads a modulated signal sent from the power transmission apparatus 101 using that binary data.

The signal processing unit 211 also generates a modulated signal to respond to the power transmission apparatus 101. The first switching unit 212 carries out PWM control on the first switch SW1 on the basis of the modulated signal generated by the signal processing unit 211. The resonance point of the parallel resonance circuit 25 changes when the first switch SW1 has been turned on. Accordingly, the power transmission current IDC on the power transmission apparatus 101 side changes, and the control circuit 11 reads the binary data modulated signal sent from the power receiving apparatus 201 on the basis of the change in the power transmission current IDC.

The communication unit 214 communicates bidirectionally with the load RL. In the case where communication is started between the power receiving apparatus 201 and the power transmission apparatus 101, the communication unit 214 notifies the load RL of the start of communication with the power transmission apparatus 101. Upon receiving that notification, the load RL sends a response thereto to the power receiving apparatus 201. The second switching unit 213 turns the second switch SW2 on or off based on the response received by the communication unit 214.

In particular, having received the start of communication from the power receiving apparatus 201, the load RL detects the remaining charge in the secondary battery and determines whether or not the load RL can operate on the power of the secondary battery alone based on a result of the detection. When the load RL can operate on the power of the secondary battery alone, the load RL sends, to the power receiving apparatus 201, a response indicating that the supply of power to the power receiving apparatus 201 can be cut off. Upon the power receiving apparatus 201 receiving this response, the second switching unit 213 turns the second switch SW2 off. The supply of power from the power receiving apparatus 201 to the load RL is cut off as a result.

Meanwhile, when the load RL cannot operate on the power of the secondary battery alone, the load RL sends, to the power receiving apparatus 201, a response indicating that the supply of power from the power receiving apparatus 201 cannot be cut off. Upon the power receiving apparatus 201 receiving this response, the second switching unit 213 keeps the second switch SW2 on. Power continues to be supplied from the power receiving apparatus 201 to the load RL as a result. By continuing the supply of power to the load RL, a problem where the load RL forcefully shuts down due to an insufficient supply of power can be prevented.

Note that in the case where the load RL cannot operate on the power of the secondary battery alone, power is supplied from the power receiving apparatus 201 for a set amount of time, and when the load RL can once again operate on the power of the secondary battery alone, a response indicating that the supply of power to the power receiving apparatus 201 can be cut off is sent to the power receiving apparatus 201.

In the case where the communication between the power transmission apparatus 101 and the power receiving apparatus 201 has ended, the second switching unit 213 turns the second switch SW2 on. The communication unit 214 then notifies the load RL that the communication has ended.

Operations executed by the power transmission apparatus 101, the power receiving apparatus 201, and the load RL, respectively, will be described hereinafter. The descriptions in the present embodiment are given assuming that communication is requested from the power transmission apparatus 101 side in the case where the power transmission apparatus 101 and the power receiving apparatus 201 communicate. In this case, for example, the transmitted voltage is momentarily increased (or reduced) on the power transmission apparatus 101 side. On the power receiving apparatus 201 side, it is determined that the power transmission apparatus 101 side is requesting communication when the voltage detected by the signal processing unit 111 has momentarily increased (or decreased).

Note that communication may be requested from the power receiving apparatus 201 side. In this case, for example, communication may be requested of the power transmission apparatus 101 side by The first switching unit 212 turning the first switch SW1 on and off and generating the binary data modulated signal.

Figure 2:
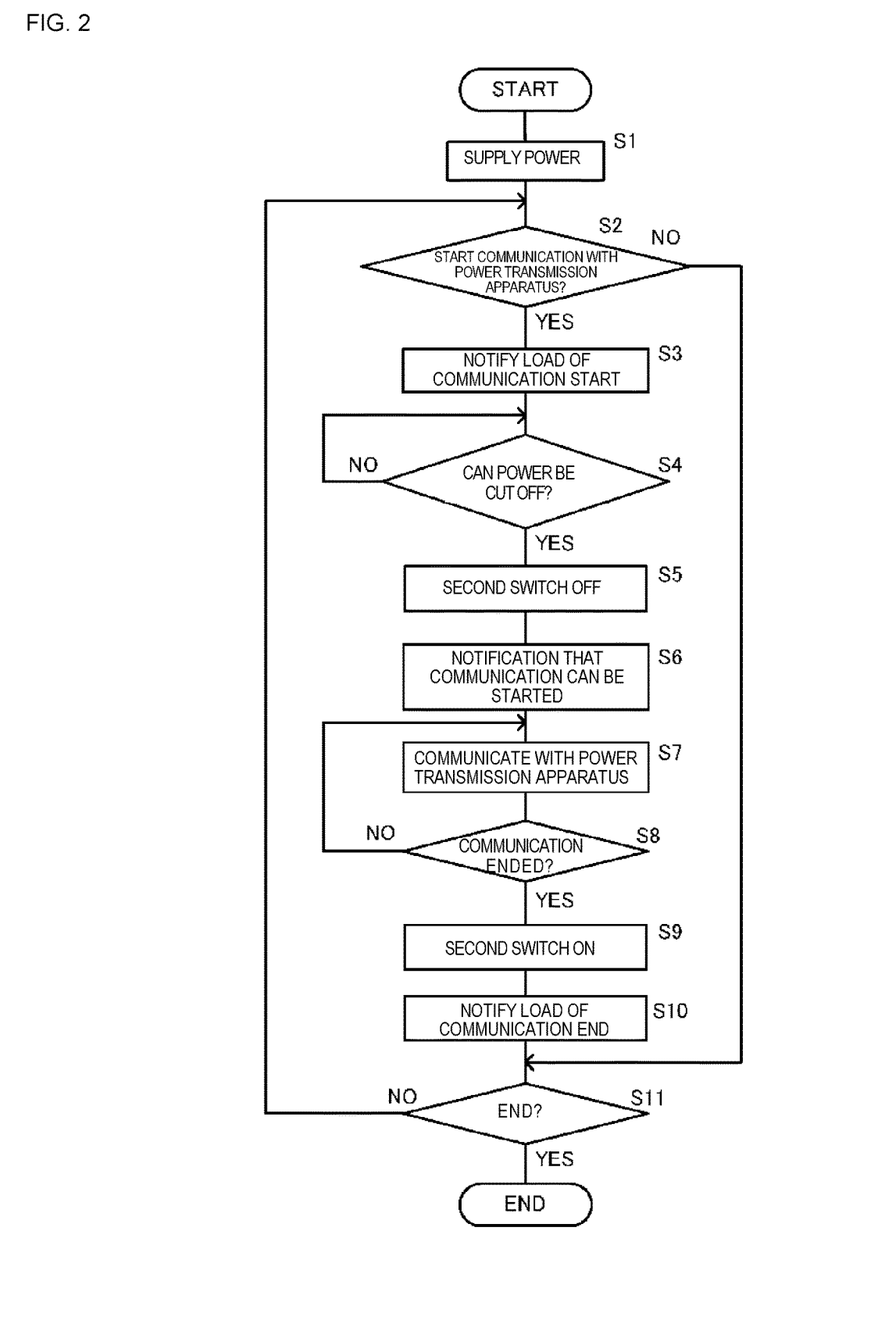
FIG. 2 is a diagram illustrating a flowchart of processing executed by a power receiving apparatus.

FIG. 2 is a diagram illustrating a flowchart of processing executed by the power receiving apparatus 201. It is assumed that the first switch SW1 is off and the second switch SW2 is on when the processing illustrated in FIG. 2 is started.

When the supply of power from the power transmission apparatus 101 is started (S1), the power receiving apparatus 201 determines whether or not to start communication with the power transmission apparatus 101 (S2). In the case where communication with the power transmission apparatus 101 is not started (S2: NO), the process of S11, described later, is executed.

In the case where communication with the power transmission apparatus 101 is started (S2: YES), the communication unit 214 of the power receiving apparatus 201 notifies the load RL of the start of communication (S3). The communication unit 214 then receives a response to the notification and determines whether or not the supply of power to the load RL can be cut off (S4). As described earlier, the load RL that has been notified of the start of communication detects the charge remaining in the secondary battery, determines whether or not the load RL can operate on the power of the secondary battery alone on the basis of the detection result, and sends the result of the determination to the power receiving apparatus 201.

In the case where the supply of power to the load RL cannot be cut off (S4: NO), or in other words, in the case where the load RL cannot operate on the power of the secondary battery alone, the power receiving apparatus 201 stands by until the supply of power to the load RL can be cut off. At this time, the second switching unit 213 keeps the second switch SW2 on. Power continues to be supplied from the power receiving apparatus 201 to the load RL as a result. Accordingly, problems caused by insufficient power on the load RL side can be prevented. Note that the communication with the power transmission apparatus 101 may be forcefully suspended and the process may return to S2 in the case where no notification is received even after a predetermined amount of time has passed.

In the case where the supply of power to the load RL can be cut off (S4: YES), or in other words, in the case where the load RL can operate on the power of the secondary battery alone, the second switching unit 213 of the power receiving apparatus 201 turns the second switch SW2 off (S5). The supply of power from the power receiving apparatus 201 to the load RL is cut off as a result. Then, by the signal processing unit 211 generating the modulated signal and the first switching unit 212 carrying out switching control on the first switch SW1, the power transmission apparatus 101 side is then notified that communication can be started (S6).

The communication unit 214 of the power receiving apparatus 201 communicates with the power transmission apparatus 101 (S7). In the case where the power transmission apparatus 101 sends a signal, the switch changing unit 112 of the power transmission apparatus 101 carries out switching control on the switch elements of the inverter circuit 10, the signal processing unit 211 of the power receiving apparatus 201 detects a change in the voltage, and the binary data modulated signal is obtained from that voltage change. In the case where the power receiving apparatus 201 sends a signal, the first switching unit 212 carries out switching control on the first switch SW1 on the basis of the modulated signal generated by the signal processing unit 111, the signal processing unit 111 of the power transmission apparatus 101 detects a change in the power transmission current IDC, and the binary data modulated signal is obtained from that change.

The second switch SW2 is off while the power receiving apparatus 201 and the power transmission apparatus 101 are communicating. Accordingly, when the load is varied by carrying out switching control on the first switch SW1 and the signal to send to the power transmission apparatus 101 is generated, the effects of the load variation caused by the supply of power to the load RL can be suppressed. This makes it possible for the power receiving apparatus 201 and the power transmission apparatus 101 to communicate accurately.

The power receiving apparatus 201 then determines whether or not the communication with the power transmission apparatus 101 has ended (S8). In the case where the communication has not ended (S8: NO), the power receiving apparatus 201 continues communicating with the power transmission apparatus 101. In the case where the communication has ended (S8: YES), the second switching unit 213 of the power receiving apparatus 201 turns the second switch SW2 on (S9). The communication unit 214 of the power receiving apparatus 201 then notifies the load RL of the end of the communication with the power transmission apparatus 101 (S10).

The power receiving apparatus 201 then determines whether or not to end the present operations due to, for example, the power source being turned off or the power receiving apparatus 201 being removed from the power transmission apparatus 101 (S11). In the case where the operations are not ended (S11: NO), the power receiving apparatus 201 executes the process of S2. In the case where the operations are to be ended (S11: YES), the present processing ends.

Figure 3:
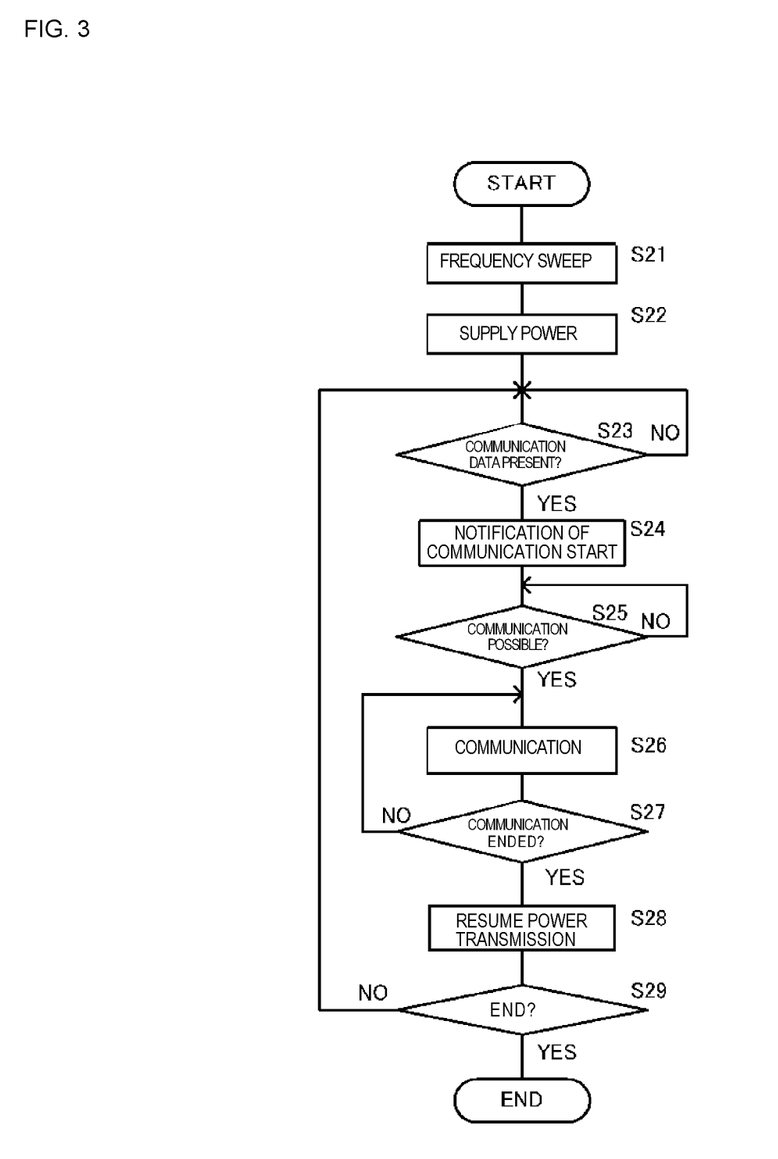
FIG. 3 is a diagram illustrating a flowchart of processing executed by a power transmission apparatus.

FIG. 3 is a diagram illustrating a flowchart of processing executed by the power transmission apparatus 101. This processing is started due to the power receiving apparatus 201 being placed on the power transmission apparatus 101, for example.

The control circuit 11 of the power transmission apparatus 101 carries out switching control on the switch elements of the inverter circuit 10 using the switch changing unit 112, performs a frequency sweep on the power transmitted to the power receiving apparatus 201, and detects the resonance point (resonant frequency) (S21). In the case where the resonance point has been successfully detected, the control circuit 11 determines that the power receiving apparatus 201 is placed on the power transmission apparatus 101 and starts the supply of power to the power receiving apparatus 201.

Next, the power transmission apparatus 101 transmits power to the power receiving apparatus 201 using the detected resonant frequency as a driving frequency (S22). The power transmission apparatus 101 determines whether or not there is communication data to send to the power receiving apparatus 201 (S23). In the case where there is no communication data (S23: NO), the power receiving apparatus 201 repeatedly executes the process of S23. In the case where there is communication data (S23: YES), the power transmission apparatus 101 notifies the power receiving apparatus 201 of the start of communication (S24). The power transmission apparatus 101 then determines whether or not a response to the notification, or in other words, a notification as to whether or not communication with the power receiving apparatus 201 is possible, has been received from the power receiving apparatus 201 (S25).

In the case where communication is not possible (S25: NO), or in other words, in the case where a response has not been received from the power receiving apparatus 201, the power transmission apparatus 101 stands by until a response is received. At this time, the start of communication with the power receiving apparatus 201 may be suspended when a response has not been received even after a set amount of time has passed.

In the case where communication is possible (S25: YES), the power receiving apparatus 201 starts communication with the power transmission apparatus 101 (S26). In this case, the switch changing unit 112 changes the on duty of each switch element of the inverter circuit 10 and carries out PWM control on the switch elements. The power transmission apparatus 101 then determines whether or not to end the communication with the power receiving apparatus 201 (S27). In the case where the communication is not to be ended (S27: NO), the power transmission apparatus 101 continues communicating with the power receiving apparatus 201. In the case where the communication is to be ended (S27: YES), the power transmission apparatus 101 resumes transmitting power to the power receiving apparatus 201 using the resonant frequency detected in S21 as the driving frequency (S28).

The power transmission apparatus 101 then determines whether or not to end the present processing due to the power source being turned off, the power receiving apparatus 201 that was placed thereon being removed, or the like (S29). In the case where the processing is not ended (S29: NO), the power transmission apparatus 101 executes the process of S23. In the case where the operations are to be ended (S29: YES), the present processing ends.

Figure 4:
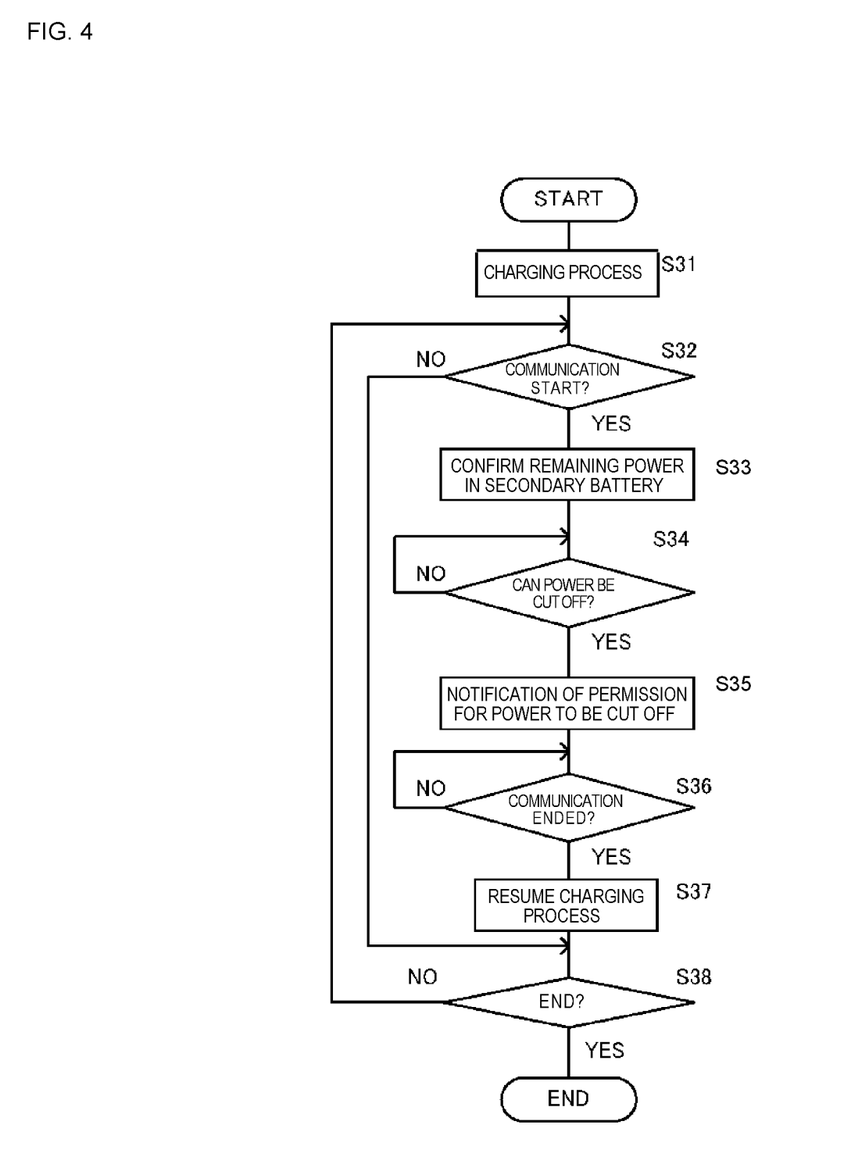
FIG. 4 is a diagram illustrating a flowchart of processing executed by a load.

FIG. 4 is a diagram illustrating a flowchart of processing executed by the load RL.

When power is transmitted from the power receiving apparatus 201, the load RL charges the secondary battery with that power (S31). Next, the load RL determines whether or not a notification of the start of communication between the power transmission apparatus 101 and the power receiving apparatus 201 has been received from the power receiving apparatus 201 (S32). In the case where the notification of the start of communication has not been received (S32: NO), the process of S38, described later, is executed.

In the case where the notification of the start of communication has been received (S32: YES), the load RL confirms the charge remaining in the secondary battery (S33), and on the basis of that result, determines whether or not the supply of power from the power receiving apparatus 201 can be cut off (S34). In the case where the supply of power cannot be cut off (S34: NO), the load RL stands by until the supply of power can be cut off.

In the case where the supply of power can be cut off (S34: YES), the load RL sends a notification permitting the power to be cut off to the power receiving apparatus 201 (S35). Having received this notification, the power receiving apparatus 201 turns the second switch SW2 off, and the supply of power from the power receiving apparatus 201 to the load RL is cut off. Note that in the case where the supply of power from the power receiving apparatus 201 is cut off, the load RL may carry out a process for making advance preparations so that the charge remaining in the secondary battery is not exhausted and a power outage does not occur while the supply of power is cut off. For example, the load RL may beforehand end processes that consume large amounts of power, or may enter a power saving mode that limits some functions in order to consume less power than when in a standard mode.

The load RL determines whether or not a notification indicating that the communication between the power transmission apparatus 101 and the power receiving apparatus 201 has ended has been received from the power receiving apparatus 201 (S36). In the case where no notification has been received (S36: NO), the load RL stands by until the notification is received. In the case where the notification has been received (S36: YES), the second switch SW2 is turned on on the power receiving apparatus 201 side, and thus the transmission of power from the power receiving apparatus 201 is resumed and the load RL resumes the process for charging the secondary battery (S37).

The load RL determines whether or not to end the present processing due to a normal termination in which the power of the load RL is turned off, the power receiving apparatus 201 being removed from the power transmission apparatus 101, or the like (S38). In the case where the processing is not ended (S38: NO), the load RL executes the process of S32. In the case where the processing is ended (S38: YES), the present processing ends.

As described thus far, according to the present embodiment, the power receiving apparatus 201 turns the second switch SW2 on and does not communicate with the power transmission apparatus 101 in the case where the supply of power to the load RL cannot be cut off. In the case where the supply of power to the load RL can be cut off, the power receiving apparatus 201 turns the second switch SW2 off and communicates with the power transmission apparatus 101. By communicating with the power transmission apparatus 101 in a state where the second switch SW2 is off, the effects of the load variation caused by the supply of power to the load RL can be prevented from affecting the communication between the power receiving apparatus 201 and the power transmission apparatus 101. This makes communication possible accurately.

Second Embodiment

A power transmission system according to a second embodiment will be described hereinafter. The following will only describe differences from the first embodiment.

Figure 5:
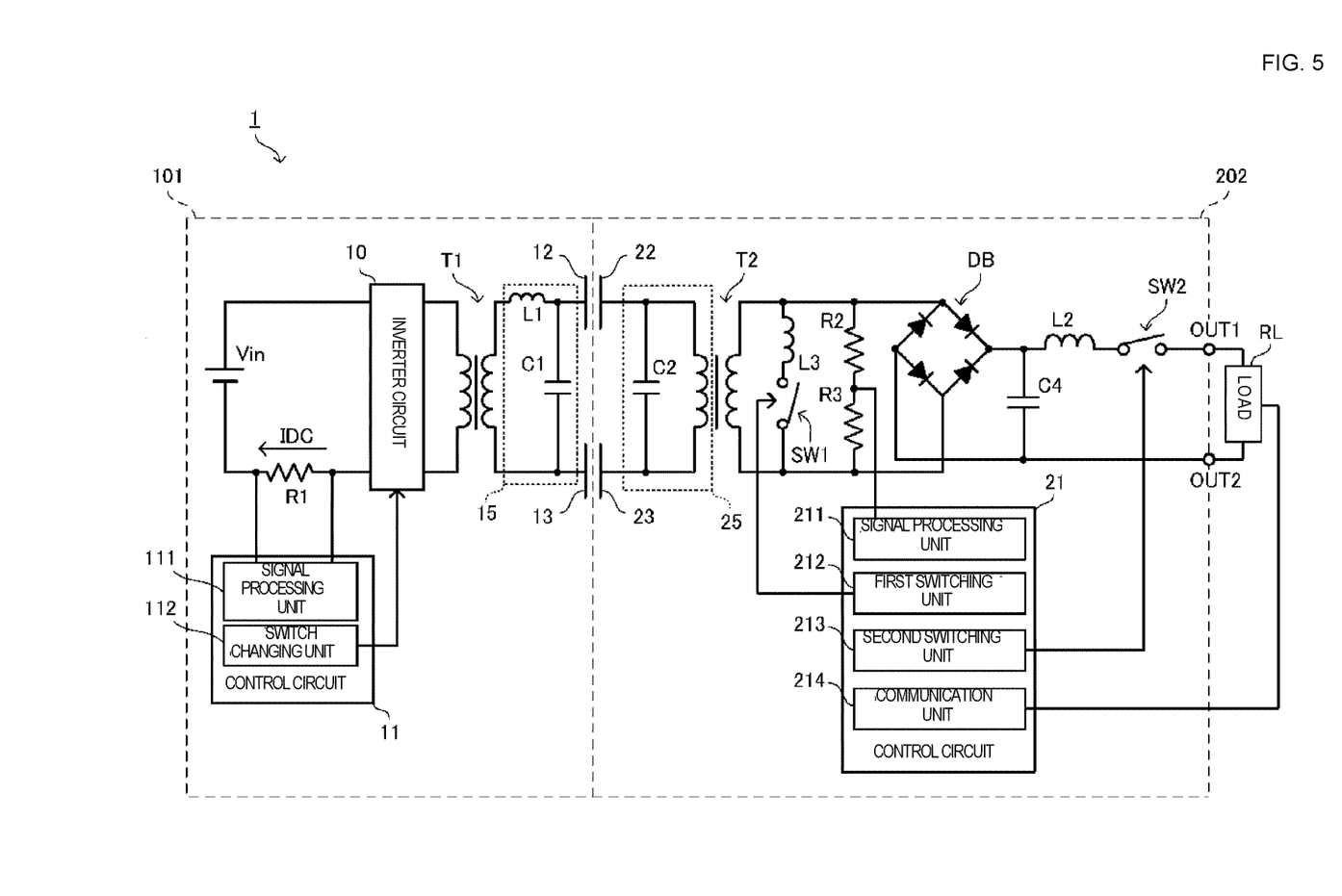
FIG. 5 is a circuit diagram of a power transmission system according to a second embodiment.

FIG. 5 is a circuit diagram of a power transmission system according to the present embodiment. In this example, a power receiving apparatus 202 has a different configuration from that of the power receiving apparatus 201 according to the first embodiment. In the present embodiment, a serial circuit for shifting the resonance point of the parallel resonance circuit 25 provided in the power receiving apparatus 202 is formed by connecting an inductor L3 and the first switch SW1 in series. The serial circuit constituted by the inductor L3 and the first switch SW1 corresponds to a "resonance condition changing circuit" according to the present disclosure.

The first switch SW1 of the serial circuit is PWM-controlled by the control circuit 21. In the case where the first switch SW1 has been turned on, a circuit configuration in which the inductor L3 is connected to the parallel resonance circuit 25 in parallel is formed. In other words, the resonance point of the parallel resonance circuit 25 can be shifted by turning the first switch SW1 on, and the load impedance can be varied by turning the first switch SW1 on and off, as in the first embodiment.

Meanwhile, the power receiving apparatus 202 according to the present embodiment performs switching control on the first switch SW1 and communicates with the power transmission apparatus 101 even in the case where the second switch SW2 is on. In other words, the power receiving apparatus 202 communicates with the power transmission apparatus 101 while supplying power to the load RL. In this case, the load RL side transits to a low-power mode, in which functions are limited, in order to reduce the effects of load variation caused by the supply of power to the load RL.

Figure 6:
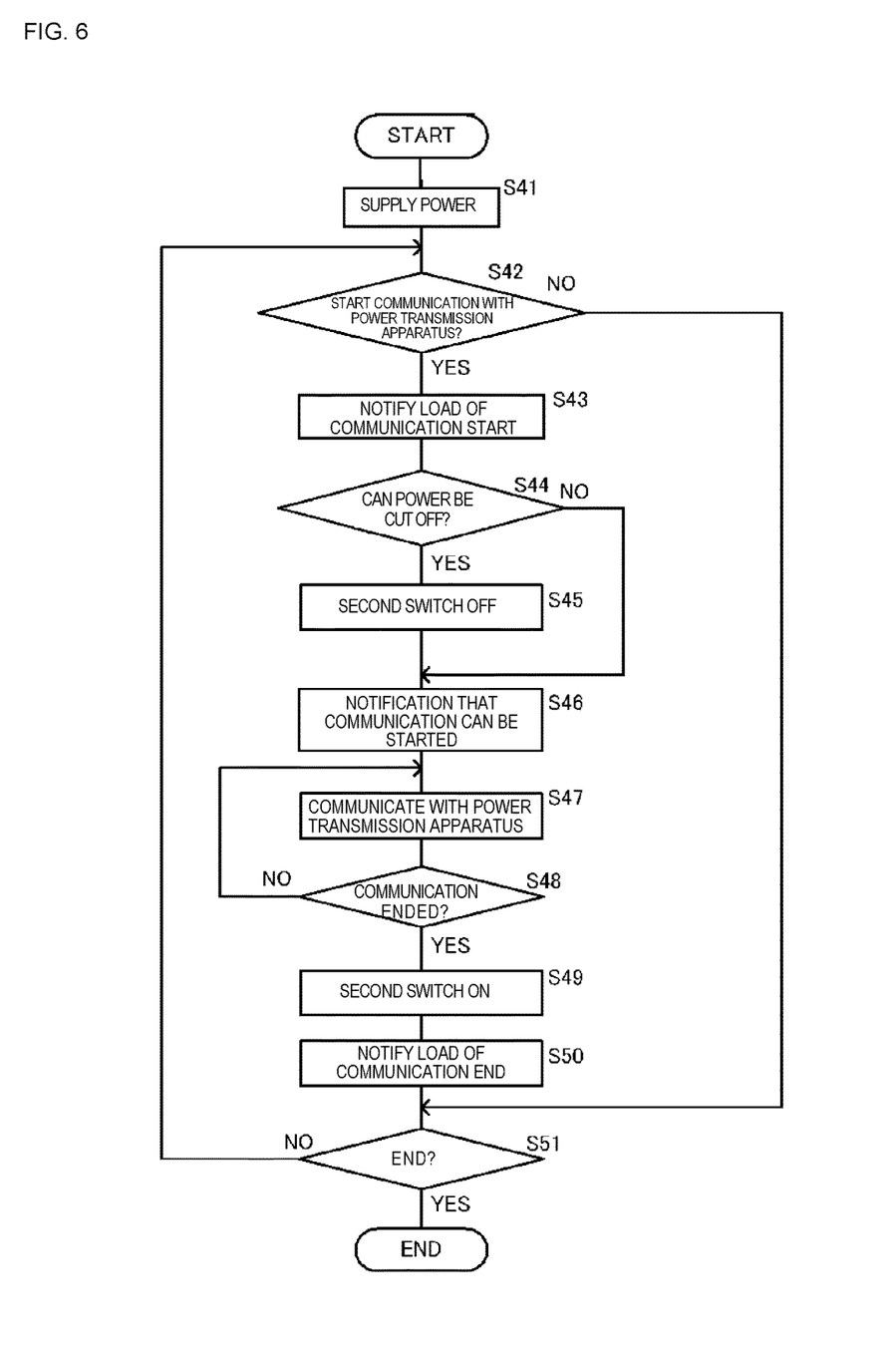
FIG. 6 is a flowchart of processing executed by a power receiving apparatus.

FIG. 6 is a diagram illustrating a flowchart of processing executed by the power receiving apparatus 202. When the supply of power from the power transmission apparatus 101 is started (S41), the power receiving apparatus 202 determines whether or not to start communication with the power transmission apparatus 101 (S42). In the case where communication with the power transmission apparatus 101 is not started (S42: NO), the process of S51, described later, is executed.

In the case where communication with the power transmission apparatus 101 is started (S42: YES), the communication unit 214 of the power receiving apparatus 202 notifies the load RL of the start of communication (S43). The communication unit 214 then receives a response to the notification and determines whether or not the supply of power to the load RL can be cut off (S44).

As in the first embodiment, the load RL that has been notified of the start of communication detects the charge remaining in the secondary battery, determines whether or not the load RL can operate on the power of the secondary battery alone on the basis of the detection result, and sends the result of the determination to the power receiving apparatus 202.

In the case where the supply of power to the load RL can be cut off (S44: YES), or in other words, in the case where the load RL can operate on the power of the secondary battery alone, the second switching unit 213 of the power receiving apparatus 202 turns the second switch SW2 off (S45). The supply of power from the power receiving apparatus 202 to the load RL is cut off as a result. Then, by the signal processing unit 211 generating the modulated signal and the first switching unit 212 carrying out switching control on the first switch SW1, the power transmission apparatus 101 side is then notified that communication can be started (S46).

In the case where the supply of power to the load RL cannot be cut off (S44: NO), or in other words, in the case where the load RL cannot operate on the power of the secondary battery alone, the second switching unit 213 of the power receiving apparatus 202 notifies the power transmission apparatus 101 side that communication can be started while keeping the second switch SW2 on (S46). Power continues to be supplied from the power receiving apparatus 202 to the load RL as a result. Accordingly, problems caused by insufficient power on the load RL side can be prevented.

As this time, the load RL side transits to the low-power mode, reducing the effects of the load variation, caused by the supply of power to the load RL, on the communication between the power transmission apparatus 101 and the power receiving apparatus 202.

The communication unit 214 of the power receiving apparatus 202 communicates with the power transmission apparatus 101 (S47). The power receiving apparatus 202 then determines whether or not the communication with the power transmission apparatus 101 has ended (S48). In the case where the communication has not ended (S48: NO), the power receiving apparatus 202 continues communicating with the power transmission apparatus 101. In the case where the communication has ended (S48: YES), the second switching unit 213 of the power receiving apparatus 202 turns the second switch SW2 on if the second switch SW2 is off (S49). The communication unit 214 of the power receiving apparatus 202 then notifies the load RL of the end of the communication with the power transmission apparatus 101 (S50).

The power receiving apparatus 202 then determines whether or not to end the present operations (S51). In the case where the operations are not ended (S51: NO), the power receiving apparatus 202 executes the process of S42. In the case where the operations are ended (S51: YES), the present processing ends.

Figure 7:
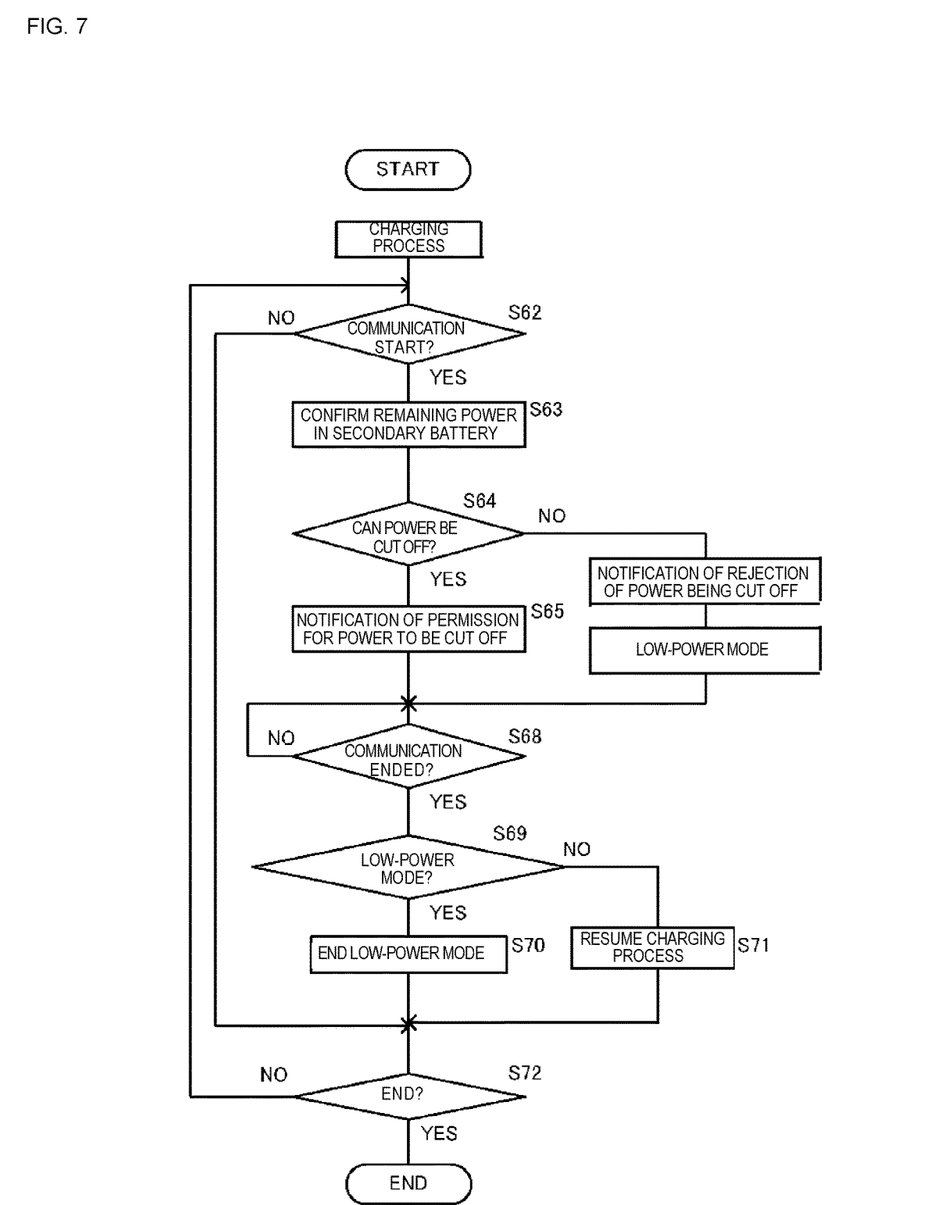
FIG. 7 is a diagram illustrating a flowchart of processing executed by a load.

FIG. 7 is a diagram illustrating a flowchart of processing executed by the load RL.

When power is transmitted from the power receiving apparatus 202, the load RL charges the secondary battery with that power (S61). Next, the load RL determines whether or not a notification of the start of communication between the power transmission apparatus 101 and the power receiving apparatus 202 has been received from the power receiving apparatus 202 (S62). In the case where the notification of the start of communication has not been received (S62: NO), the process of S72, described later, is executed.

In the case where the notification of the start of communication has been received (S62: YES), the load RL confirms the charge remaining in the secondary battery (S63), and on the basis of that result, determines whether or not the supply of power from the power receiving apparatus 202 can be cut off (S64). In the case where the supply of power can be cut off (S64: YES), the load RL sends a notification permitting the power to be cut off to the power receiving apparatus 202 (S65). Having received this notification, the power receiving apparatus 202 turns the second switch SW2 off, and the supply of power from the power receiving apparatus 202 to the load RL is cut off.

In the case where the supply of power cannot be cut off (S64: NO), the load RL sends a notification that the power cannot be cut off to the power receiving apparatus 202 (S66). Having received this notification, the power receiving apparatus 202 keeps the second switch SW2 on. Power continues to be supplied from the power receiving apparatus 202 to the load RL as a result. The load RL then transits to the low-power mode (S67). The low-power mode is, for example, a mode in which functions having high processing loads are limited. By the load RL switching to the low-power mode, even if the power transmission apparatus 101 and the power receiving apparatus 202 are communicating in a state in which the second switch SW2 is on, the effects of the load variation, caused by the supply of power to the load RL, on that communication can be reduced.

The load RL determines whether or not a notification indicating that the communication between the power transmission apparatus 101 and the power receiving apparatus 202 has ended has been received from the power receiving apparatus 202 (S68). In the case where no notification has been received (S68: NO), the load RL stands by until the notification is received. In the case where a notification has been received (S68: YES), the load RL determines whether or not the load RL itself is in the low-power mode (S69). In the case where the load RL is in the low-power mode (S69: YES), the load RL ends the low-power mode.

In the case where the load RL is not in the low-power mode (S69: NO), the supply of power from the power receiving apparatus 202 is resumed from the state in which the second switch SW2 on the power receiving apparatus 202 side is turned off and the supply of power from the power receiving apparatus 202 was stopped, and thus the load RL resumes the process of charging the secondary battery (S71).

The load RL determines whether or not to end the present processing due to a normal termination in which the power of the load RL is turned off, the power receiving apparatus 202 being removed from the power transmission apparatus 101, or the like (S72). In the case where the processing is not ended (S72: NO), the load RL executes the process of S62. In the case where the processing is ended (S72: YES), the present processing ends.

As described thus far, according to the present embodiment, the power receiving apparatus 202 communicates with the power transmission apparatus 101 in a state where the second switch SW2 is on in the case where the supply of power to the load RL cannot be cut off. Through this, the risk of unanticipated problems arising in the load RL due to insufficient power, such as forced shutdowns, for example, can be suppressed.

Third Embodiment

Figure 8:
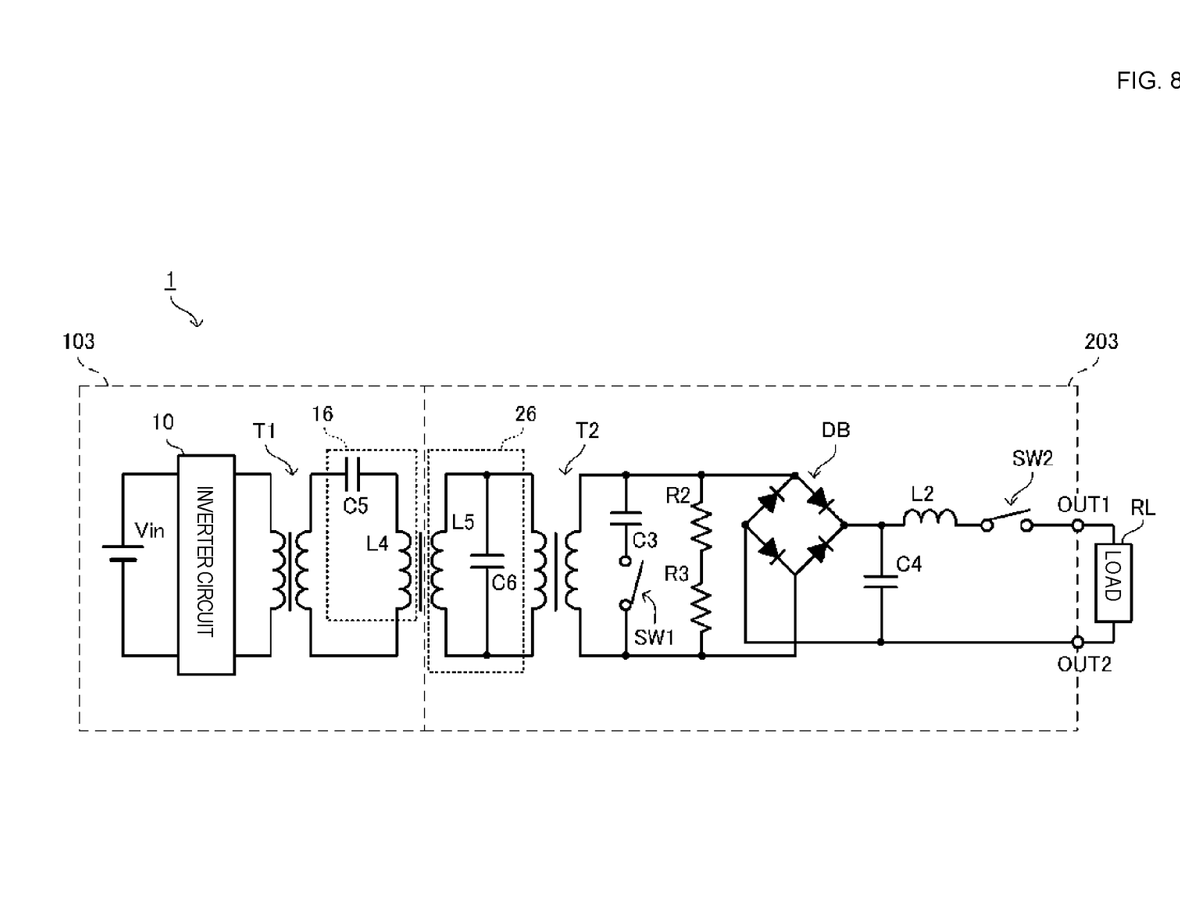
FIG. 8 is a circuit diagram of a power transmission system according to a third embodiment.

FIG. 8 is a circuit diagram of a power transmission system 3 according to a third embodiment. As opposed to the power transmission systems according to the first and second embodiments, which transmit power through electric field coupling, the power transmission system 3 according to the third embodiment transmits power through magnetic field coupling.

In a power transmission apparatus 103, a power transmission-side coupling coil L4 is connected to the secondary coil of the step-up transformer T1. The power transmission-side coupling coil L4 and a capacitor C5 form a serial resonance circuit 16. The power transmission-side coupling coil L4 is an example of a "power transmission-side coupling unit" and a "power transmission-side coil" according to the present disclosure.

In a power receiving apparatus 203, a power receiving-side coupling coil (a power receiving-side coil according to the present disclosure) L5, in which a high-frequency current is induced through electromagnetic induction with the power transmission-side coupling coil L4, is connected to the primary coil of the step-down transformer T2. The power receiving-side coupling coil L5 and a capacitor C6 form a parallel resonance circuit 26. The power receiving-side coupling coil L5 is an example of a "power receiving-side coupling unit" and a "power receiving-side coil" according to the present disclosure.

Note that other configurations of the power transmission apparatus 103 and the power receiving apparatus 203 are the same as in the first embodiment. Likewise, the operations executed by the power transmission apparatus 103 and the power receiving apparatus 203 are the same as in the first embodiment, and thus descriptions thereof will be omitted.

Although the "resonance condition changing circuit" according to the present disclosure is described as a serial circuit constituted by the capacitor C3 or the inductor L3 and the first switch SW1 in the first, second, and third embodiments, the present invention is not limited thereto. For example, a serial circuit constituted by a capacitor and an inductor connected in series or in parallel and a switch may be employed. Alternatively, any circuit capable of shifting the resonance point of the resonance circuit may be used.

REFERENCE SIGNS LIST 1, 3 POWER TRANSMISSION SYSTEM
10 INVERTER CIRCUIT
11 CONTROL CIRCUIT
12, 22 ACTIVE ELECTRODE
13, 23 PASSIVE ELECTRODE
15, 16 SERIAL RESONANCE CIRCUIT
21 CONTROL CIRCUIT
22 ACTIVE ELECTRODE
23 PASSIVE ELECTRODE
25, 26 PARALLEL RESONANCE CIRCUIT
101, 103 POWER TRANSMISSION APPARATUS
111 SIGNAL PROCESSING UNIT
112 SWITCH CHANGING UNIT
201, 202, 203 POWER RECEIVING APPARATUS
211 SIGNAL PROCESSING UNIT
212 FIRST SWITCHING UNIT
213 SECOND SWITCHING UNIT
214 COMMUNICATION UNIT
C1, C2, C3, C4, C5, C6 CAPACITOR
T1 STEP-UP TRANSFORMER
T2 STEP-DOWN TRANSFORMER
SW1 FIRST SWITCH
SW2 SECOND SWITCH DB DIODE BRIDGE
L1, L2, L3 INDUCTOR
L4 POWER TRANSMISSION-SIDE COUPLING COIL
L5 POWER RECEIVING-SIDE COUPLING COIL
R1 CURRENT DETECTION RESISTANCE
R2, R3 VOLTAGE DIVIDING RESISTANCE
OUT1, OUT2 OUTPUT TERMINAL
RL LOAD
Vin POWER SOURCE

The invention claimed is:

1. A power receiving apparatus that receives power from a power transmission apparatus having a power transmission coupling unit, the power receiving apparatus comprising:
a power receiving coupling unit configured to be electrically field coupled or magnetically field coupled with the power transmission coupling unit of the power transmission apparatus;
a resonance circuit connected to the power receiving coupling unit;
a resonance condition changing circuit including a first switch that changes a resonance condition of the resonance circuit based on a state of the first switch;
a rectifying and smoothing circuit that rectifies and smoothes an AC voltage outputted from the resonance circuit and supplies the voltage to a load;
a second switch that connects or disconnects the rectifying and smoothing circuit to the load; and
a control circuit configured to:
notify the load of a start of communication with the power transmission apparatus and receive a response from the load;
control the state of the first switch to generate a signal to be sent to the power transmission apparatus; and
control the second switch to connect or disconnect the rectifying and smoothing circuit to the load based on the response received from the load.

2. The power receiving apparatus according to claim 1, wherein the control circuit is configured to turn the second switch off to stop a supply of power to the load and to turn the second switch on to supply power to the load.

3. The power receiving apparatus according to claim 2, wherein the control circuit is configured to turn the first switch off to supply the power to the load.

4. The power receiving apparatus according to claim 1, wherein the resonance condition changing circuit is a serial circuit that includes the first switch and an inductor connected in parallel to the resonance circuit.

5. The power receiving apparatus according to claim 1, wherein the resonance condition changing circuit is a serial circuit that includes the first switch and a capacitor connected in parallel to the resonance circuit.

6. The power receiving apparatus according to claim 1, wherein the power receiving coupling unit has a first active electrode and a first passive electrode,
wherein the first active electrode opposes a second active of the power transmission coupling unit, with a gap disposed between the first and second active electrodes,
wherein the first passive electrode opposes a second passive electrode of the power transmission-side coupling unit, with a gap disposed between the first and second passive electrodes or the first and second passive electrodes are in contact with each other, and
wherein the resonance circuit is connected to the first active electrode and the first passive electrode.

7. The power receiving apparatus according to claim 1, wherein the power receiving coupling unit includes a power receiving coil that couples with a power transmission coil provided of the power transmission coupling unit through a magnetic field, and
wherein the resonance circuit is connected to the power receiving coil.

8. The power receiving apparatus according to claim 1, wherein the response received from the load indicates whether a battery of the load contains sufficient power for the communication of data between the power transmission apparatus and the load.

9. The power receiving apparatus according to claim 8, wherein the control circuit is configured to control the second switch to disconnect the rectifying and smoothing circuit from the load when the battery contains sufficient power for the communication of data between the power transmission apparatus and the load.

10. The power receiving apparatus according to claim 8, wherein the control circuit is configured to control the second switch to connect the rectifying and smoothing circuit to the load when the battery does not contain sufficient power for the communication of data between the power transmission apparatus and the load.

11. A power transmission system comprising:
a power transmission apparatus that includes a power transmission-side coupling unit; and
a power receiving apparatus that includes:
a power receiving coupling unit configured to be electrically field coupled or magnetically field coupled with the power transmission coupling unit of the power transmission apparatus;
a resonance circuit connected to the power receiving coupling unit;
a resonance condition changing circuit that includes a first switch that changes a resonance condition of the resonance circuit based on a state of the first switch;
a rectifying and smoothing circuit that rectifies and smoothes an AC voltage outputted from the resonance circuit and supplies the voltage to a load;
a second switch that connects or disconnects the rectifying and smoothing circuit to the load; and
a control circuit configured to:
notify the load of a start of communication with the power transmission apparatus and receive a response from the load;
control the state of the first switch to generate a signal to be sent to the power transmission apparatus; and
control the second switch to connect or disconnect the rectifying and smoothing circuit to the load based on the the response from the load.

12. The power transmission system according to claim 11, wherein the control circuit is configured to turn the second switch off to stop a supply of power to the load and to turn the second switch on to supply power to the load.

13. The power transmission system according to claim 11, wherein the control circuit is configured to turn the first switch off to supply the power to the load.

14. The power transmission system according to claim 11, wherein the resonance condition changing circuit is a serial circuit that includes the first switch and an inductor connected in parallel to the resonance circuit.

15. The power transmission system according to claim 11, wherein the resonance condition changing circuit is a serial circuit that includes the first switch and a capacitor connected in parallel to the resonance circuit.

16. The power transmission system according to claim 11,
wherein the power transmission coupling unit includes a first active electrode and a first passive electrode,
wherein the power receiving coupling unit has a second active electrode and a second passive electrode,
wherein the first active electrode opposes the second active electrode with a gap disposed therebetween,
wherein the first passive electrode opposes the second passive electrode with a gap disposed therebetween or the first and second passive electrodes are in contact with each other, and
wherein the resonance circuit is connected to the second active electrode and the second passive electrode.

17. The power transmission system according to claim 11,
wherein the power transmission coupling unit has a power transmission coil,
wherein the power receiving coupling unit has a power receiving coil that couples with the power transmission coil through a magnetic field, and
wherein the resonance circuit is connected to the power receiving coil.

18. The power transmission system according to claim 11, wherein the response received from the load indicates whether a battery of the load contains sufficient power for the communication of data between the power transmission apparatus and the load.

19. The power receiving apparatus according to claim 18, wherein the control circuit is configured to control the second switch to disconnect the rectifying and smoothing circuit from the load when the battery contains sufficient power for the communication of data between the power transmission apparatus and the load.

20. The power receiving apparatus according to claim 18, wherein the control circuit is configured to control the second switch to connect the rectifying and smoothing circuit to the load when the battery does not contain sufficient power for the communication of data between the power transmission apparatus and the load.

* * * * *